June 25, 1946.　　　A. L. ELLIS　　　2,402,742
POWER TRANSMISSION
Filed July 23, 1935　　　3 Sheets-Sheet 1

INVENTOR
ARTHUR L. ELLIS
BY
Ralph L. Tweedale
HIS ATTORNEY.

Fig. 2.

June 25, 1946.　　　A. L. ELLIS　　　2,402,742
POWER TRANSMISSION
Filed July 23, 1935　　　3 Sheets-Sheet 3
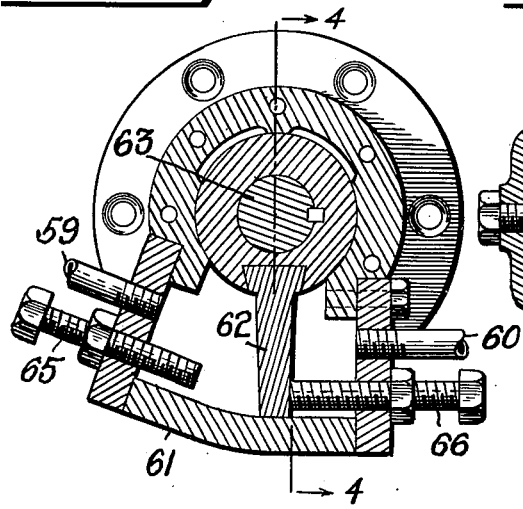
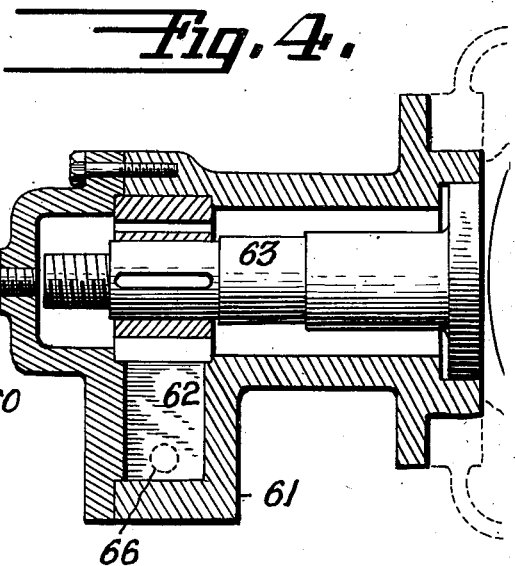
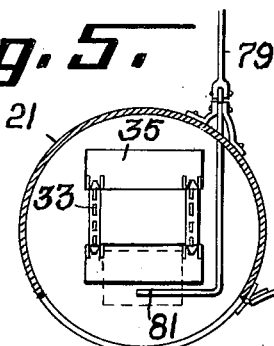
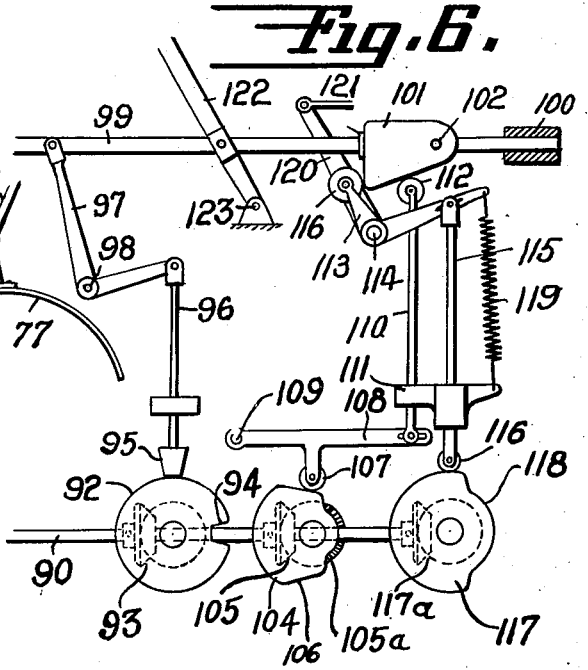
INVENTOR
ARTHUR L. ELLIS
BY
Ralph L. Tweedale
HIS ATTORNEY.

Patented June 25, 1946

2,402,742

UNITED STATES PATENT OFFICE 2,402,742

POWER TRANSMISSION

Arthur L. Ellis, Deep River, Conn., assignor to The Waterbury Tool Company, Waterbury, Conn., a corporation of Connecticut Application July 23, 1935, Serial No. 32,755

14 Claims. (Cl. 198—37)

This invention relates, generally, to power transmissions and the invention has reference, more particularly, to a novel fluid or hydraulic pressure operated and controlled drive system adapted to automatically drive a load device through a predetermined cycle of operation. Such a power transmission is adapted for use with many different load devices with which it is desirable to be able to control the acceleration and deceleration precisely for driving the device with varying velocity through a predetermined cycle of operation.

For example, the present invention is particularly suitable for hoists or conveyors for transporting articles from one point to another. If the articles to be transported are of a fragile or delicate nature, such that damage is likely to occur if they are subjected to jars and jolts, it becomes desirable to provide a conveyor drive which will insure not only that the conveyor itself does not cause any jarring of the articles loaded thereon but also that the conveyor may be loaded and unloaded by the attendants without requiring a high degree of dexterity to insure against damage occurring when placing articles thereon and removing them therefrom while maintaining a reasonably high speed of transportation on the conveyor.

These and other considerations make it desirable to provide a conveyor drive which may be controlled to operate, for example, a chain type conveyor, at varying speeds and with varying accelerations and decelerations under precise and positive control. Thus, for example, in some conveyor installations it is desirable to operate the conveyor intermittently with a period of rest for loading at one end and unloading at the other end, and then upon the completion of loading and unloading to move the conveyor through the distance required to bring an article into place at the unloading station and an empty flight into place at the loading station. It is desirable to so control the conveyor drive as to make this movement start and stop with the maximum acceleration and deceleration, respectively, consistent with the previously mentioned limitations regarding jarring of the articles on the conveyor.

Heretofore, chain type conveyors or hoists have largely been driven by electric motors, either directly or through reduction gearing, and in order to obtain the wide variations in speed required to operate such hoists efficiently, it has been necessary, even when using a D. C. supply, to employ a complicated and easily deranged system of electric rheostats and control units. It is far preferable to use an A. C. supply with the result that it has been exceedingly difficult, if not impossible, to obtain the desired speed variation necessary for the efficient operation of electric motor driven chain type hoists owing to the inherent nature of A. C. motors to operate at constant or synchronous speed, and as a result, attempts have been made to operate some chain hoists continuously at constant speed, which is not only inefficient because of the necessarily low speed of operation, but is hard on the attendants since they must load and unload the articles while the conveyor or hoist is moving, and this must be done without undue jolting or jarring of the fragile articles.

The principal object of the present invention is to provide a novel hoist or chain conveyor drive that is operated and controlled by fluid or hydraulic pressure, thereby insuring smooth, quiet and vibrationless operation of the hoist or conveyor driven thereby, the said novel drive when applied to a hoist serving, upon the loading of an article on to the receiving end of the temporarily stationary hoist and the removal of an article from the delivery end thereof, provided an article has reached the hoist delivery end, firstly, to automatically start and accelerate the hoist or conveyor chain with a maximum feasible acceleration for a short period, secondly, to drive the hoist or conveyor at a substantially constant speed for a short interval, and thirdly, to decelerate the hoist with a maximum feasible deceleration to a stop, the hoist chain having moved a distance equal to the space between successive chain flights during such period of motion, whereupon the operation or cycle is again automatically repeated, and so on as long as desired, the hoist moving intermittently and the articles being loaded and removed during the periods when the hoist is stationary. Alternatively the second or constant speed step in the operating cycle may be omitted when it is possible to use the full movement for acceleration and deceleration.

Another object of the present invention lies in the provision of a novel fluid pressure hoist drive system that employs a "Waterbury" hydraulic variable speed transmission for conveying the operating energy from an electric motor or other suitable and preferably substantially constant speed power source to the hoist or conveyor, the said hoist drive system having fluid pressure operated control means for determining the periods of operation and the speeds of operation of the "Waterbury" motor or B-end that drives the hoist or conveyor, said control means being responsive to such factors as the loading and unloading of articles, the closing of conveyor casing doors, etc., in addition to the predetermined setting or adjustment of the output capacity of the transmission pump or A-end.

A further object is to provide a novel hoist or conveyor drive system comprising a substantially constant speed motor, a variable speed transmission driven by the motor and a hoist or conveyor driven by the transmission at varying speeds and accelerations.

It is also an object to provide a control system for a variable speed transmission operable to drive a load device through a predetermined cycle of operations in response to conditions at the load device.

Still another object of the present invention is to provide a novel fluid pressure hoist drive system that is of rugged and of comparatively simple construction, the same eliminating the use of troublesome variable electrical resistances, change gears, etc., the said system being adapted for manual operation and control of the hoist drive when desired, as upon failure of the supply current to the electric driving motor.

Further objects and advantages of the present invention will be apparent from the following description, reference being had to the accompanying drawings wherein a preferred form of the present invention is clearly shown.

In the drawings:

Fig. 2 is a schematic view in elevation, illustrating the remaining portion of the hoist drive of Fig. 1.

Fig. 3 is an enlarged sectional detail view of the means employed in Fig. 1 for varying the output of the pump end of the variable speed transmission.

Fig. 4 is a part sectional view taken along line 4—4 of Fig. 3, looking in the direction of the arrows.

Fig. 5 is an enlarged fragmentary sectional view taken along line 5—5 of Fig. 2, looking in the direction of the arrows.

Fig. 6 is a fragmentary view showing a position of the cam mechanism during the operation of the hoist.

Figure 1:
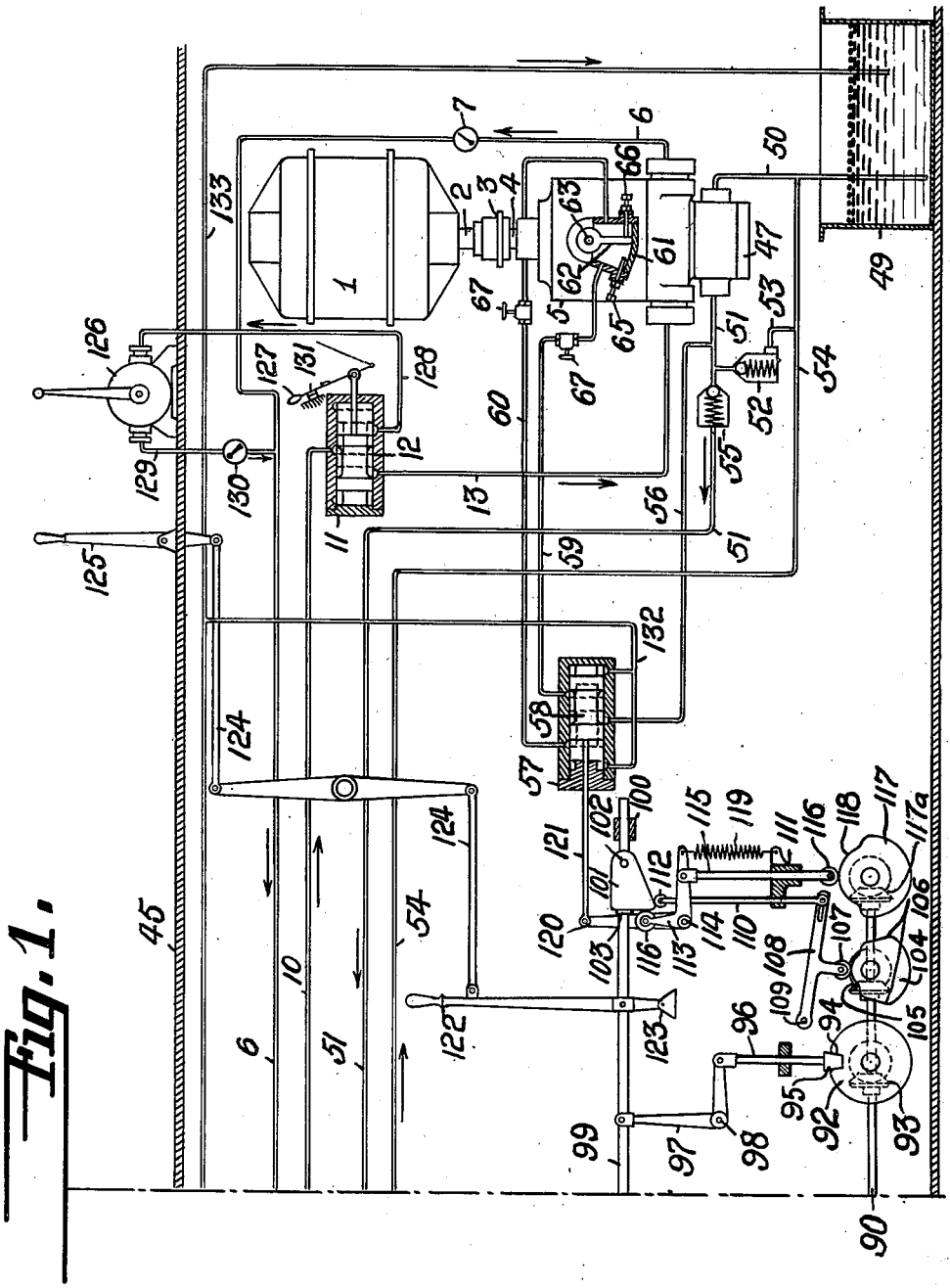
Fig. 1 is a schematic view in elevation, illustrating a portion of the novel fluid pressure operated and controlled hoist drive of this invention employed for operating a hoist or conveyor of the chain type.

Referring now to the drawings, the reference numeral 1 designates a substantially constant speed electric motor, such as a synchronous motor where an A. C. supply is used, the said motor having its rotor shaft 2 connected in driving relation through a flexible coupling 3 to the main shaft 4 of a fluid pump 5 of a "Waterbury" transmission. The construction and operation of this type of transmission, including the fluid pump 5, is old and well known to those skilled in the art and hence would appear to require no detailed description, a brief description of the same being given in my Patent No. 1,868,697 of July 26, 1932.

Generally this type of transmission comprises a fluid pump, termed the A-end which pumps a suitable pressure motive fluid, hereinafter referred to merely as oil, to a fluid motor, termed the B-end. Either the A-end or the B-end, or both are constructed so that the displacement may be varied relative to the displacement of the opposite end thereby providing for the transmission of power at variable speed and torque ratios. In the form illustrated the A-end is provided with means for varying its displacement by regulating the piston stroke while the B-end is of fixed displacement.

It is to be understood that any suitable, preferably constant speed motive means may be used in lieu of motor 1 for driving the pump 5, for example, a turbine or engine may be used, and this motive means may be geared down, if desired.

According to the preferred arrangement, the pump or A-end 5 delivers oil through pipe line 6 having a check valve 7 therein to the casing 8 of a by-pass valve 9 of the piston type. With the by-pass valve 9 in the position shown in Fig. 2, oil from supply pipe line 6 flows within casing 8 to the return pipe line 10 leading to the casing 11 of a manually operated interlock valve 12, also of the piston type. With interlock valve 12 in the position shown in Fig. 1, oil from casing 11 flows through return pipe line 13 back to the pump or A-end 5.

Figure 2:
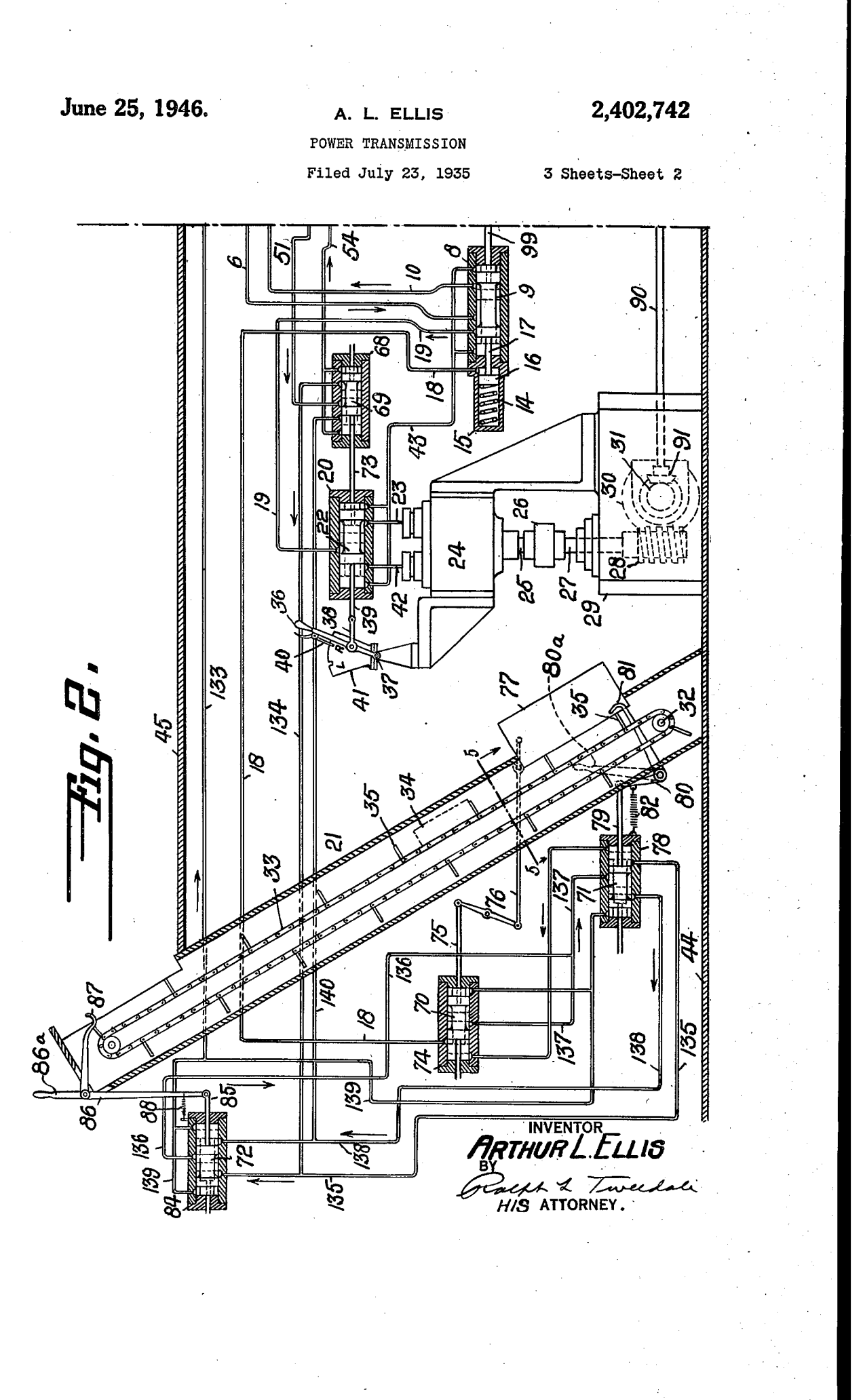

By-pass valve 9 is biased to the position shown in Fig. 2 by the action of a coil compression spring 14 contained within a hydraulic cylinder 15 that is attached to one end of valve casing 8. Spring 14 presses upon a hyraulic piston 16 reciprocable within cylinder 15 and having a piston rod 17 extending through the head of cylinder 15 for fixed attachment to valve 9, so that the pressure of spring 14 on piston 16 is transmitted through rod 17 to urge valve 9 into the position shown in Fig. 2. Under suitable conditions, as will further appear, control pressure fluid is supplied through pipe 18 to the space between piston 16 and the head of cylinder 15, thereby forcing piston 16 outwardly against the tension of spring 14 into the dotted line position shown in Fig. 2, in which position operating fluid or oil delivered by supply pipe line 6 flows within casing 8 to pipe line 19 and through this pipe line into the casing 20 of a reversing valve 22 of the piston type.

With reversing valve 22 in the position shown in Fig. 2, pressure operating fluid flows from casing 20 through pipe 23 into one port of the rotary hydraulic motor or B-end 24 of the "Waterbury" transmission, thereby driving the hydraulic motor 24, the oil leaving this motor by its other port and passing through pipe 42 to casing 22, from which this oil flows by way of pipe 43 to valve casing 8 and thence by way of return pipe line 10 back to pump 5. The main shaft 25 of this motor 24 is thus caused to rotate in one direction, which motion is transmitted through a flexible coupling 26 to a worm shaft 27. Shaft 27 extends into a reduction gear housing 29 and has a worm 28 fixed thereon that meshes with worm wheel 30 fixed on a drive shaft 31, which drive shaft drives the driving sprockets 32 of the hoist chains 33 through a suitable driving connection, not shown.

Thus, with operating pressure fluid supplied through pipe 23, the motor 24 acts through reduction gearing 28, 30 and shaft 31 to rotate sprockets 32 in a counter-clockwise direction, as viewed in Fig. 2, thereby effecting the raising of articles 34 carried by the flights 35 of chains 33.

Reversing valve 22 is adapted to be held or locked in the "raising" position illustrated in Fig. 2 by means of a manual operating lever 36 pivotally supported at 37 and connected by link 38 to the operating rod 39 of valve 22. Lever 36 is shown as held or locked by the spring pressed detent 40 engaging a notch in a segmental plate 41, the notch being designated on the plate 41 by the indicia "R," signifying "raising," i. e., the position of detent 40 to effect the raising or elevation of articles from floor 44 to floor 45.

If detent 40 is released and lever 36 thrown to the left in Fig. 2, so that this detent enters notch "L," then reversing valve 22 will have been moved to its dotted line position, in which position, pressure fluid supplied from pipe 19 enters motor 24 by way of pipe 42 and leaves by way of pipe 23, thereby rotating this motor in the reverse direction to cause the lowering of articles from floor 45 to floor 44.

The fluid pressure control means for automatically controlling the operation of the "Waterbury" transmission and hence the operation of the hoist 21, comprises an auxiliary pump 47 having its operating shaft coupled to an extension of the main shaft 4 of the pump or A-end 5. Auxiliary pump 47 serves to draw oil or other suitable pressure fluid from the tank or reservoir 49 through pipe 50 and delivers this oil into a control pipe line 51. A relief valve 52 connects with control pipe line 51 and the setting of this valve determines the maximum fluid pressure obtaining in this pipe line 51. Relief valve 52 discharges through pipes 53, 54 and 59 back into reservoir 49.

A relief valve 55 is included in pipe line 51 and the setting of this valve determines the substantially constant pressure with which oil is delivered to a pipe 56 branching from pipe line 51 at a point between valve 55 and pump 47. As will further appear, oil delivered through pipe 56 is adapted to pass into the casing 57 of a pilot control valve 58, and thence this oil passes through one of the two pipes 59 or 60, depending upon the position of valve 58, to the segmental casing 61 of a hydraulic control means having a fan type impeller 62 therein that is fixed on the control shaft 63 of the pump or A-end 5.

Impeller 62 is actuated by or turned within casing 61 by the oil or other pressure fluid delivered by pipes 59 or 60, thereby turning control shaft 63 and determining the output of pump 5. Adjustable stop screws 65 and 66 are threaded inwardly through opposite sides of casing 61 for limiting the turning movement of impeller 62. Thus, screw 65 by limiting the clockwise turning movement of impeller 62 (see Figs. 1 and 3) serves to determine the maximum output of pump 5, whereas screw 66 by limiting the counter-clockwise turning movement of impeller 62, serves to determine the minimum output or displacement of the pump 5, so that this pump will always deliver a certain amount of oil, thus maintaining a flow within the pipe line 6. Pipes 59 and 60 are illustrated as having suitable adjustable chokes 67 therein to control the rate of flow of oil to and from the segmental casing 61, thereby determining the rate at which impeller 62 is moved, and hence the rate at which the output of pump 5 changes, which in turn determines the rate of acceleration and deceleration of the motor 24 and hoist 21.

Oil from auxiliary pump 47 passing valve 55 flows within control pipe line 51 to the casing 68 of a pilot reverse valve 69. Pilot reverse valve 69 serves to reverse the flow of control oil or fluid supplied to a series of pilot valves 70, 71 and 72 and is connected by a rod 73 to the reversing valve 22 for actuation by the latter. Pilot valve 70 is movable within a casing 74 and is actuated by a rod 75 connected through linkage 76 to the hoist loading door 77. Pilot valve 71 is movable within a casing 78 and is actuated by a rod 79 connected to a trip lever 80 having an upturned free end portion 81 that is positioned, with the hoist 21 stationary, adjacent a chain flight 35 adapted to receive an article at the loading position. A suitable tension spring 82 tends to hold the valve 71 in the full line position shown in Fig. 2, in which position the trip lever end portion 81 projects somewhat above the adjacent stationary chain flight 35. A hand lever 80a is rigidly secured to the trip lever 80 for manual operation thereof.

Pilot valve 72 is movable within a casing 84 and is actuated by a rod 85 connected to a trip lever 86 having a downturned free end portion 87 that is positioned, with the hoist 21 stationary, adjacent a chain flight 35 at the top of the hoist. A suitable tension spring 88 tends to hold the valve 72 in the full line position shown in Fig. 2, in which position the trip lever end portion 87 projects somewhat below the adjacent stationary chain flight 35. A hand lever 86a is rigidly secured to the trip lever 86 for manual operation thereof. As will further appear, pilot valves 70, 71 and 72 are so interconnected that during the raising cycle, i. e., when articles are being raised from floor 44 to floor 45, the hoist or conveyor 21 will start to operate only after three conditions have been fulfilled, i. e., firstly, an article must be placed in the lower loading position, thereby depressing lever end portion 81 and actuating trip lever 80 to move valve 71 from its full line to its dotted line position; secondly, the loading door 77 must be closed, thereby operating linkage 76 to move valve 70 from its full line to its dotted line position; and thirdly, any article in the upper delivery position must have been removed so that pilot valve 72 is in the full line position shown in Fig. 2. Likewise, during the lowering cycle, i. e., when articles are being lowered from floor 45 to floor 44, the conveyor will start to operate only after three conditions have been fulfilled, i. e., firstly an article must have been put into the upper loading position, thereby actuating lever 86 counterclockwise to move valve 72 to its dotted line position; secondly, the loading door 77 must be closed, thereby operating linkage 76 to move valve 70 to its dotted line position; and thirdly, any article in the lower or normally loading position must have been removed so that pilot valve 72 is actuated by spring 82 to its full line position shown in Fig. 2. On either the raising or lowering cycle the presence of an article at either terminal position may be simulated so far as operation of the control apparatus is concerned by manually holding the appropriate one of the hand levers 80a, 86a against the tension of the corresponding spring 82 or 88.

In order to provide for the automatic stopping of the hoist after the same has moved the distance between two consecutive flights 35, control mechanism comprising a shaft 90 is driven from drive shaft 31 as by bevel gears 91. Shaft 90 is shown (see Fig. 1) driving a cam 92 through bevel gears 93. Cam 92 has a circular periphery concentric with its rotating axis and is provided with a single depression or neutral position notch 94 for receiving a follower 95 cooperating with the periphery of this cam. Follower 95 is carried by the lower end of a link 96 having its upper end pivotally connected to a bell crank lever 97 fulcrumed at 98. Lever 97 is connected to a rod 99 having one end portion extending into valve casing 8 and fixed to the bypass valve 9.

The other end portion of rod 99 is journalled in a fixed slide bearing 100.

A latch 101 is pivoted at 102 on rod 99 and is normally held by gravity in the position shown in Fig. 1. A suitable stop 103 on latch 101, by engaging rod 99, prevents this latch from turning to a lower position. A cam 104 is driven from shaft 90 by suitable bevel gearing 105, so as to turn at the same rate as cam 92. Cam 104 has two angularly spaced rises 106 thereon adapted to engage a roller 107 carried by a lever 108 fulcrumed at 109. A link 110 has its lower end pivotally connected to lever 108 and extends upwardly through a fixed slide bearing block 111, the upper end of this link carrying a roller 112 for tripping the latch 101. Thus, when either of the rises 106 passes under roller 107, depending on the direction of rotation, the bell crank lever 108 is actuated in a counter-clockwise direction to cause link 110 to elevate latch 101 so that the same cannot engage a roller 116 carried by an arm of a bell crank lever 113 fixed on a shaft 114. The other arm of bell crank lever 113 has a depending link 115 pivoted thereto, the lower portion of link 115 extending through slide bearing block 111 and having a roller 116 on its lower end for cooperating with the periphery of a circular cam 117. Cam 117 is driven from shaft 90 by suitable bevel gearing to turn at the same rate as cams 92 and 104. The cams 92, 104, and 117 are so geared to the hoist driving mechanism that one revolution of the cams takes place during the time required to move the conveyor chain 33 through the distance between adjacent flights 35.

The periphery of cam 117 is concentric with its turning axis and has a peripheral depression 118 in which the roller 116 is illustrated in Fig. 1 as engaged. A tension spring 119 extends between lever 113 and bearing block 111 for urging roller 116 against the periphery of cam 117. Shaft 114 has an upstanding lever 120 fixed thereon, the upper end of which lever is pivotally connected to the outer end of the valve operating rod 121 connected to pilot control valve 58.

In order to provide for the manual operation of by-pass valve 9 as during emergency starting or stopping of the hoist, a hand lever 122 is provided in the lower loading position, i. e., at floor 44, the said lever being fulcrumed at 123 and pivotally connected to rod 99. Suitable linkage 124, or equivalent mechanical or electrical mechanism, may be used to connect lever 122 to a similar lever 125 at the upper position, i. e., at floor 45. A hand operated pump 126, shown adjacent lever 125, is employed for supplying pressure operating oil to the system in the event motor 1 fails to operate due, for example, to the failure of the supply current. When it is desired to operate pump 126, the manual operating lever 127 of interlock valve 12 is thrown from the full line position of Fig. 1 to the dotted line position, thereby moving interlock valve 12 to its dotted line position. The hand pump 126 may now be operated to draw oil from pipe line 10 through valve casing 11 and pipe 128 into the pump casing, whence the pump forces this oil through pipe 129 past check 130 into the supply pipe line 6. A similar hand operated pump may be provided on floor 44, if desired. A pair of cooperating interlock contacts 131 are included in the control circuit for motor 1, one of these contacts being carried by lever 127 and the other being mounted on a fixed support, the said contacts being engaged when the interlock valve 12 is in its full line position shown in Fig. 1, and being disengaged when lever 127 is thrown to the right for manual operation of the system by use of pump 126, thereby preventing the starting of motor 1 during such manual operation.

In operation, assuming that it is desired to elevate articles from floor 44 to floor 45, the control lever 127 is positioned in its full line position and operating lever 36 is positioned so that its detent 40 engages the notch designated "R" in segmental plate 41, thereby positioning valves 22 and 69 in their full line positions. Motor 1 is now started, thereby causing pump or A-end 5 to circulate oil through pipe line 6, by-pass valve casing 8 and pipe line 10 back to the pump 5, as shown by the arrows in Figs. 1 and 2. At the same time, the driven auxiliary pump 47 acts to deliver oil into the control pipe line 51. A small portion of this oil enters branch pipe 56, and with the pilot control valve 58 set in the full line position shown in Fig. 1, oil flows from pipe 56 through casing 57 and pipe 59 into the segmental casing 61, thereby turning impeller 62 in a counter-clockwise direction until the same abuts stop screw 66, i. e., assuming that impeller 62 did not initially abut this stop screw. This movement of impeller 62 causes oil to pass out of segmental casing 61 through pipe 60 into control valve casing 57 and thence this oil flows through pipe 132 to a return pipe 133 leading back to reservoir 49. The pump 5 is thus caused to deliver oil at the minimum rate determined by the setting of screw 66.

Oil delivered from auxiliary pump 47 also flows through control pipe line 51 past valve 55 into the casing 68 of pilot reverse valve 69, from which casing this oil passes through pipe 134 to a pipe 135. Within pipe 135 this oil flows to the casing 84 of pilot valve 72. Since this valve is in its full line position, the oil flows from casing 84 through a pipe 136 to a pipe 137, and thence into the casing 78 of pilot valve 71, which valve is in its full line position. From casing 78 the oil flows through pipe 138 back into the casing 84 of pilot valve 72, whence this oil flows through pipe 139 into pipe 133 and thence back into reservoir 49. A portion of the oil may flow from pipe 138 back to reservoir 49 by way of pipe 140, valve casing 68 and pipe 54. The circuit of the oil from auxiliary pump 47 back to reservoir 49 is shown by arrows in Figs. 1 and 2.

If now, an article 34 is loaded onto the hoist flight 35 at the lower loading position, thereby depressing lever end portion 81 and actuating pilot valve 71 to its dotted position, and the door 77 closed, thereby actuating pilot valve 70 to its dotted position, an oil control circuit is established to the hydraulic cylinder 15 for causing piston 16 to move to the left so that the output of the pump or A-end 5 is connected to the motor or B-end 24. This oil control circuit is from pipe 134 through pipe 135, pilot valve housing 78, pipe 137, valve housing 74 and pipe 18 to hydraulic cylinder 15, thereby forcing piston 16 toward the left against the tension of spring 14 and actuating by-pass valve 9 toward the left to its dotted line position, in which position oil from supply pipe line 6 flows through valve casing 8 and pipe line 19 to valve casing 20 and thence through pipe 23 to the B-end 24 for operating the motor.

If either an article is not loaded on the hoist at the lower loading station or the door 77 is not closed, the hoist will not start, it being necessary that both an article be loaded on the hoist and the door 77 closed before oil can be supplied under pressure for actuating piston 16. Thus, for example, if an article is loaded, but door 77 is not closed, the control oil circuit is blocked by pilot valve 70 and cannot reach the cylinder 15. Likewise, if door 77 is closed, but an article is not loaded, the control oil circuit is blocked by pilot valve 70 cooperating with pilot valve 71. Also, if an article were at the upper or delivery station, the pilot valve 72 would be in its dotted position and would by-pass the control oil through pipes 139 and 133 so that piston 16 would not be operated.

The actuation of by-pass valve 9 toward the left also causes rod 99 to move toward the left, carrying with it the latch 101 which acts through roller 116 to turn lever 113 counterclockwise against the tension of spring 119, thereby turning shaft 114 so that lever 120 is also turned counter-clockwise, thereby actuating the pilot control valve 58 to its dotted line position. The turning of lever 113 also serves to raise roller 116 out of depression 118 of cam 117. With the valve 58 in its dotted line position, oil from pipe 56, flows through valve casing 57 into pipe 60 and thence into the segmental casing 61 of the hydraulic control means for the A-end 5, causing impeller 62 to move toward the left, thereby turning control shaft 63 to increase the output of pump or A-end 5, resulting in the acceleration of the motor or B-end 24 and a corresponding acceleration of the hoist chain 33. The chokes 67 are preferably set so as to cause impeller 62 to move at such speed as will result in the most rapid practical acceleration of the hoist. After the impeller 62 reaches the stop screw 65, the output of pump 5 no longer increases and hence the acceleration of the hoist 21 ceases and the same thereafter moves at a constant speed.

As the rod 99 moved toward the left it also acted through lever 97 to lift follower 95 out of the depression or neutral position notch 94 of cam 92, and as the hoist commences to operate, the cam 92 is rotated with the follower 95 riding on the periphery of this cam, as shown in Fig. 6. As soon as the hoist starts to operate, the article 34 just loaded on the conveyor moves upwardly out of contact with the end 81 of lever 80 so that spring 82 is allowed to move pilot valve 71 to its full line position, thereby shutting off the supply of pressure control fluid to the hydraulic cylinder 15 and connecting this cylinder to the reservoir or expansion tank 49. This connection is by pipe 18, valve casing 74, pipe 137, valve casing 78, pipe 138, pipe 140, valve casing 68, and pipe 54 to the reservoir or tank 49.

Spring 14 now tends to return the by-pass valve 9 to its full line position, but is prevented from doing so by the action of follower 95 which, acting through link 96, lever 97 and rod 99, serves to hold valve 9 in its dotted line position, so that operating oil is supplied to the B-end to continue the operation of the hoist until cam 92 makes a complete revolution and follower 95 again drops into the neutral position notch 94. Cam 92 is so geared to the conveyor 21 that the chains 33 of the latter move through a distance equal to that between two consecutive flights 35 while cam 92 makes a single revolution.

At about the time the conveyor reaches the desired maximum speed of operation, the high part of the circumference of cam 117 moves under roller 116 and thereafter roller 116, by riding on cam 117, prevents spring 119 from actuating lever 113 and hence serves to hold control valve 58 in its dotted line position for supplying control pressure fluid to retain the A-end at its maximum adjusted output. Just before the roller 116 again reaches the depression 118, one of the rises 106 on cam 104, serves, by actuating roller 107 and lever 108, to raise link 110 and turn latch 101 upwardly out of engagement with roller 116 so that spring 119 is free to move roller 116 down into notch 118 when it comes under roller 116. At the same time lever 113 is actuated in a clockwise direction, causing lever 120 to move the control valve to its full line position in Fig. 1, in which position control pressure fluid is supplied through pipe 59 to move the impeller 62 toward screw 66, thereby decreasing the output of the A-end and hence decelerating the A-end and conveyor 21.

By the time roller 116 has reached the mid length of notch 118, which occurs at the same time that follower 95 again reaches the neutral position notch 94, the hoist has been brought to rest and spring 14 within hydraulic cylinder 15 acts to move by-pass valve 9 toward the right to its full line position in Fig. 2, and simultaneously moves rod 99, follower 95 and latch 101 to their original positions shown in Fig. 1. Thus, it will be seen that while the settings of the chokes 67 determine the rate of deceleration of the hoist just as they determined the rate of acceleration of the hoist, the length of depression 118 determines the point in the cycle of hoist operation at which deceleration of the hoist shall commence.

In some installations where the distance between flights is short enough, the period of acceleration may continue to substantially the midpoint of the cycle, in which case the period of hoist operation at constant speed would be omitted and the last half of the cycle be occupied by the period of deceleration. This may be accomplished by suitable modification of the cams 104 and 117, together with proper setting of the chokes 67 and the stops 65 and 66.

The hoist has now passed through one cycle of operations, the same having started, accelerated for an interval, then moved at a desired constant speed for an interval, and then decelerated to a stop, after having covered a distance equal to that between two successive chain flights 35, said operations taking place automatically and without jolting or jarring after the oil control circuit was prepared for operation by the loading of an article and the closing of door 77, it being also necessary that any article at the upper floor 45 be removed from the hoist before the same could start. Upon loading of another article on the conveyor at the lower loading position, the closing of door 77 and the removal of an article from the upper unloading position (assuming an article has reached this position), the cycle of the hoist will again be automatically repeated.

Should it be desired to lower articles from floor 45 to floor 44, the operating lever 36 is moved so that its detent engages the notch marked "L" on plate 41, thereby moving reversing valves 22 and 69 to their dotted line positions shown in Fig. 2. If now an article is loaded onto the conveyor at the upper loading position, thereby turning lever 86 counter-clockwise and actuating pilot valve 72 to its dotted line position, and door 77 is closed with no article in the lower delivery position, the pressure oil control circuit is prepared for supplying oil to hydraulic cylinder 15 to effect the starting of the conveyor or hoist. This circuit is from line 51 through reverse valve casing 68 to pipe 140, and from pipe 140 through pipe 138, valve casing 84, pipe 136, pipe 137, valve casing 74 and pipe 18 to cylinder 15.

Piston 16 now actuates by-pass valve 9 to its dotted line position, thereby supplying pressure operating oil from supply pipe line 6, through valve casing 8, pipe 19, reverse valve casing 29, pipe 42 to B-end 24, and causing this motor to operate in the reverse direction from that previously described, so that conveyor sprockets 32 turn clockwise in Fig. 2, thereby lowering the articles from floor 45 toward floor 44. From the B-end the operating oil flows through pipe 23, casing 20, pipe 43, casing 8, pipe 10, casing 11 and pipe 13 back to the A-end. The hoist is accelerated, then operated at constant speed and then decelerated by the mechanism controlled by cams 92, 104 and 117 in the same manner as previously described in connection with the operation of the hoist to elevate articles from floor 44 to floor 45.

The pilot valves 70, 71 and 72 likewise act in a manner similar to that previously described to insure operation of the hoist only when an article is loaded at floor 45, one has been unloaded at floor 44 and door 77 is closed.

Thus, it will be noted that in use, the operation of the hoist is entirely automatic and that as soon as an article is removed from the hoist delivery end and an article loaded in the hoist at the sending end and the hoist door 77 closed, the hoist moves as rapidly as practicable through the distance between consecutive flights 35 and then comes to a stop. Owing to the use of hydraulic systems for both controlling and operating the hoist, its operation is smooth, positive and takes place without noise, jarring, or undue stress on the operating parts.

When it is desired to empty the hoist of articles from floor 44, the hand lever 86a is held to the left after the last article has been loaded at floor 45. The hoist then operates in the manner previously described to lower the articles one flight for each article removed from door 77. Likewise, when it is desired to empty the hoist from floor 45, the hand lever 80a is held to the right after the last article is loaded in door 77.

Check valve 130 in pipe 129 leading from hand pump 126 prevents pressure oil from pipe line 6 from backing up into the hand operated pump 126 when the A-end is operating. Likewise check valve 7 in pipe line 6 prevents pressure oil from backing up into the A-end 5 when the hand operated pump 126 is being used. In case the electric power to motor 1 should fail during the hoisting operation, the by-pass valve 9 will be held in hoisting position by the action of follower 95 riding on cam 92, and if the load on the conveyor is sufficient, the gear reduction unit 28—30 and the B-end 24 may overhaul by rotating in the reverse direction until follower 95 re-enters neutral position notch 94. Link 96 is preferably made of such shape that follower 95 cannot be forced out of neutral position notch 94 by the rotation of the conveyor, as when it tends to overhaul, so that this link 96 in effect locks the conveyor in place.

It will be apparent that the conveyor 21 may pass between a plurality of successive floors or horizontally on one floor instead of between the two shown, and that additional loading and unloading doors 77 may be used, if desired, the said doors being connected to pilot valves arranged in series with pilot valve 70 and pilot valve 72, respectively. Likewise while the interlocking control system for the by-pass valve 9 has been shown as hydraulic, it will be understood that equivalent electric, or combined electric and fluid circuits may be utilized for this purpose.

While the form of embodiment of the invention as herein disclosed, constitutes a preferred form, it is to be understood that other forms might be adopted, all coming within the scope of the claims which follow.

What is claimed is:

1. In combination, a fluid pressure hoist drive system and a hoist including an endless conveyor band operated thereby, said system comprising a rotary fluid pressure motor connected in driving relation to said hoist, pump means for supplying operating fluid under pressure to said motor for operating the latter, and a fluid pressure control system for regulating the operating of said pump means and said motor, said control system operating in response to the imposition of a load on said hoist to effect the automatic operation of the latter through a predetermined cycle.

2. In combination, a fluid pressure hoist drive system and a hoist operated thereby, said system comprising a fluid pressure motor connected in driving relation to said hoist, main pump means for supplying operating fluid under pressure to said motor for operating the latter, and a fluid pressure control system for regulating the operating of said pump means and said motor, said control system comprising a control fluid circuit, auxiliary pump means for supplying control fluid to said circuit, a hydraulic control for regulating the output of said main pump means, and valve means in said control fluid circuit and responsive to the loading of articles upon and the unloading of articles from said hoist for controlling the operation of said hydraulic control, whereby the output of said main pump means and hence the operation of said hoist is controlled in accordance with the demands on said hoist.

3. In combination, a fluid pressure hoist drive system and a hoist operated thereby, said system comprising a fluid motor for driving said hoist, a pressure fluid operating circuit having variable pump means for circulating pressure fluid therein, valve means in said circuit for blocking the flow of fluid to said motor, and pilot valve means responsive to the loading and unloading of said hoist for causing actuation of said blocking valve means to effect the supply of pressure fluid from said pump means to said fluid motor for operating the latter.

4. In combination, a fluid pressure hoist drive system and a hoist operated thereby, said system comprising a fluid motor for driving said hoist, a pressure fluid operating circuit having variable pump means for circulating pressure fluid therein, a fluid pressure operated control means for regulating the output of said variable pump means, valve means in said circuit for by-passing the output of said pump means, pilot valve means responsive to the loading and unloading of said hoist for causing actuation of said by-pass valve means to effect the supply of pressure fluid from said pump means to said fluid motor for operating the latter, and control valve means responsive to the actuation of said by-pass valve means and to the operation of said hoist for regulating the supply of pressure fluid to said variable pump control means.

5. In combination, a fluid pressure hoist drive system and a hoist operated thereby, said system comprising a fluid motor for driving said hoist, a pressure fluid operating circuit having variable pump means for circulating pressure fluid therein, a fluid pressure operated control means for regulating the output of said variable pump means, valve means in said circuit for by-passing the output of said pump means, pilot valve means responsive to the loading and unloading of said hoist for causing actuation of said by-pass valve means to effect the supply of pressure fluid from said pump means to said fluid motor for operating the latter, reversing valve means interposed between said by-pass valve means and said fluid motor for reversing the direction of operation of the latter to effect reverse operation of said hoist, and control valve means responsive to the actuation of said by-pass valve means and to the operation of said hoist for regulating the supply of pressure actuating fluid to said variable pump control means.

6. In combination, a fluid pressure hoist drive system and a hoist operated thereby, said system comprising a fluid motor for driving said hoist, a pressure fluid operating circuit having pump means for circulating pressure fluid therein, valve means in said circuit for by-passing the output of said pump means, fluid pressure cylinder and piston means for actuating said by-pass valve means to establish the supply of pressure fluid from said pump means to said fluid motor for operating the latter, and pilot valve means responsive to the loading of said hoist for controlling the supply of operating fluid to said fluid pressure cylinder and piston means.

7. In combination, a fluid pressure hoist drive system and a hoist operated thereby, said system comprising a variable speed fluid motor for driving said hoist, a pressure fluid operating circuit having variable output pump means therein for circulating pressure fluid therein, a by-pass valve in said circuit, said valve being biased for by-passing the output of said pump means, fluid pressure cylinder and piston means for actuating said by-pass valve to enable the supply of pressure fluid from said pump means to said fluid motor for operating the latter, pilot valve means responsive to the loading and unloading of said hoist for controlling the supply of operating fluid to said fluid pressure cylinder and piston means, and means responsive to the actuation of said by-pass valve means and to the operation of said hoist for regulating the output of said variable pump means, whereby the speed of said hoist is controlled.

8. In a fluid pressure hoist drive system for operating hoists, a fluid pressure pump having a variable output, a fluid pressure hoist motor supplied from said pump, a fluid pressure operated control device for regulating the output of said pump, and valve means controlled in response to the loading and unloading of the hoist and to the operation of the same for determining the supply of operating fluid to said control device.

9. In a fluid pressure hoist drive system for operating hoists, a fluid pressure pump having an adjustable control shaft for varying the output of said pump, a fluid pressure hoist motor supplied from said pump, a fluid pressure control device having an impeller connected to said control shaft for varying the adjustment thereof, adjustable stop means for limiting the movement of said impeller, means for supplying control pressure fluid, and valve means responsive to the loading and unloading of the hoist and to the operation of the same for controlling the flow of pressure fluid from said supplying means to said control device, thereby determining the adjustment of said control shaft.

10. In a fluid pressure hoist drive system for operating hoists, a fluid pressure pump having a variable output, a fluid pressure hoist motor supplied from said pump, a fluid pressure control device for regulating the output of said pump, a valve connected to said control device and controlled in response to the loading and unloading of the hoist and to the operation of the same for determining the supply of operating fluid to said control device, and adjustable choke means included in the connection between said valve and said control device for determining the speed of operation of said device and hence the rate of change of said pump output.

11. In combination, a fluid pressure hoist drive system and a hoist operated thereby, said system comprising a fluid pressure motor connected in driving relation to said hoist, pump means for supplying operating fluid under pressure to said motor for operating the latter, and a fluid pressure control system for regulating the operating of said pump means and said motor, said control system comprising a control fluid circuit, a hydraulic control for regulating the output of said pump means, and valve means in said control fluid circuit and responsive to the loading of articles upon and the unloading of articles from said hoist for controlling the operation of said hydraulic control, whereby the output of said pump means and hence the operation of said hoist is controlled in accordance with the demands on said hoist.

12. In combination, a fluid pressure hoist drive system and a hoist including an endless conveyor band operated thereby, said system comprising a rotary fluid pressure motor connected in driving relation to said hoist, pump means for supplying operating fluid under pressure to said motor for operating the latter, and a fluid pressure control system for regulating the operating of said motor, said control system comprising a control fluid circuit, a hydraulic control for regulating the fluid supply to said motor, and valve means in said control fluid circuit and responsive to the loading of articles upon said hoist for controlling the operation of said hydraulic control, whereby the operation of said hoist is controlled in accordance with the demands on said hoist.

13. In combination, a fluid pressure hoist drive system and a hoist operated thereby, said system comprising a fluid motor for driving said hoist, a pressure fluid operating circuit having pump means for circulating pressure fluid therein, valve means in said circuit for blocking the flow of fluid to said motor, a fluid motor for operating the blocking valve means, and pilot valve means responsive to the loading of said hoist for causing actuation of said blocking valve means to effect the supply of pressure fluid from said pump means to said fluid motor for operating the latter.

14. A conveyor system for transferring articles from a loading station to an unloading station comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive conjointly to the loading of an article on the conveyor at the loading station and the unloading of an article from the conveyor at the unloading station to automatically start the driving means, said loading station having a barrier shiftable between an open position permitting free access to the conveyor band and a closed position in which accidental removal of articles from loaded position is prevented, said starting means having a connection with said barrier effective to prevent starting when the barrier is open, and stopping means responsive to travel of the conveyor through the distance between adjacent flights to automatically stop the driving means independently of the starting means, whereby when the conveyor is once filled with articles between the stations, delivery is made automatically by a single advancing movement of the conveyor and directly responsive to the loading and unloading of articles on and off the conveyor.

ARTHUR L. ELLIS.